Jan. 3, 1928.
J. MUIR
1,655,158
INSTRUMENT FOR IMPLANTING RADON SEEDS
Filed Sept. 8, 1926   2 Sheets-Sheet 1
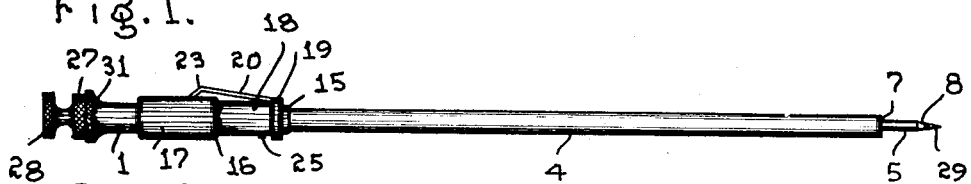
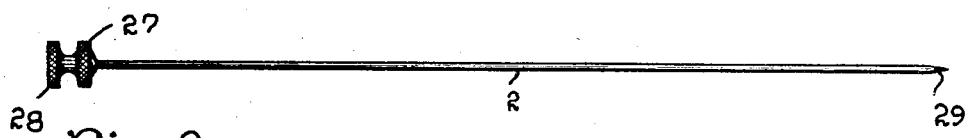
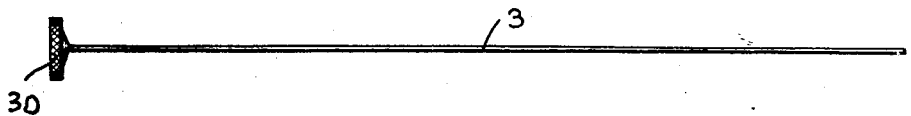
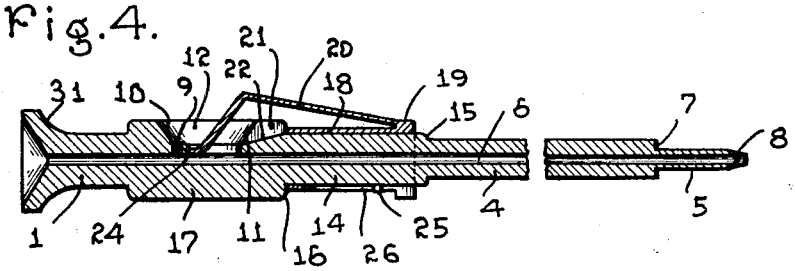
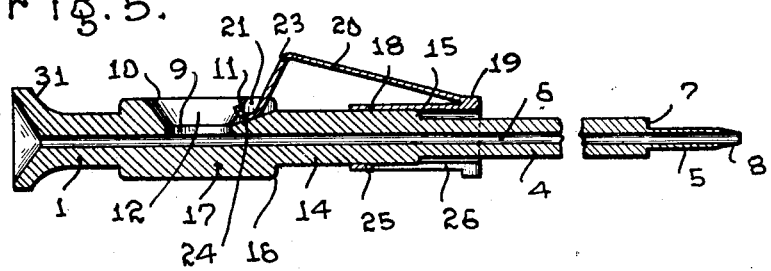
Inventor
JOSEPH MUIR Jan. 3, 1928.
J. MUIR
1,655,158
INSTRUMENT FOR IMPLANTING RADON SEEDS
Filed Sept. 8, 1926
2 Sheets-Sheet 2
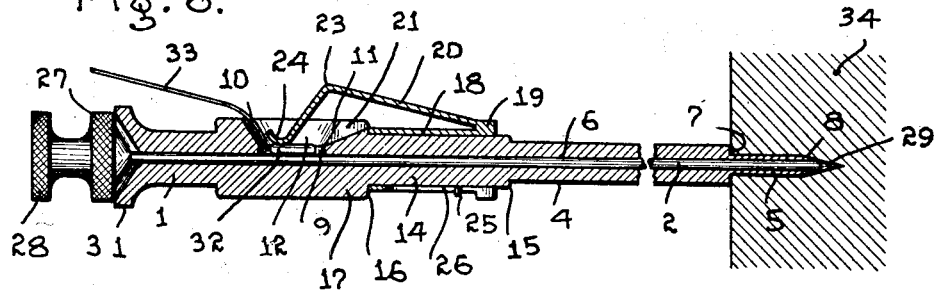
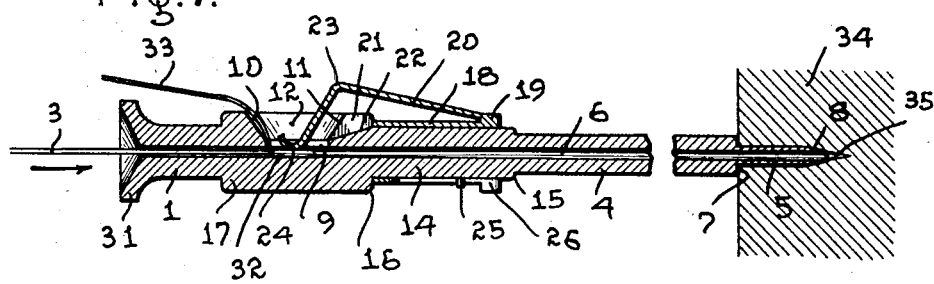
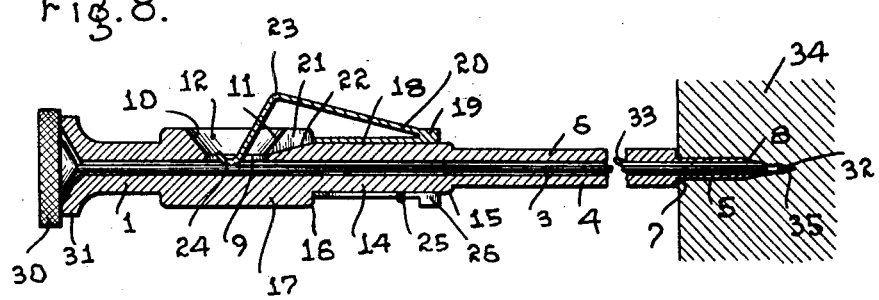
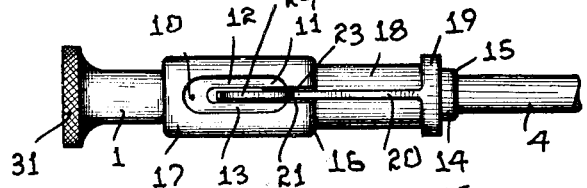
Inventor
JOSEPH MUIR
By
Attorney Patented Jan. 3, 1928.

1,655,158

UNITED STATES PATENT OFFICE.

JOSEPH MUIR, OF NEW YORK, N. Y., ASSIGNOR TO THE RADIUM EMANATION CORPORATION, OF NEW YORK, N. Y., A CORPORATION OF DELAWARE.

INSTRUMENT FOR IMPLANTING RADON SEEDS.

Application filed September 8, 1926. Serial No. 134,223.

My invention relates to improvements in instruments for implanting radon seeds. More specifically, it relates to the provision of a three-part instrument, the instrument in its preferred form being provided with an automatic arrangement for loading or inserting the seed into the bore of the instrument.

A removable radon seed may comprise a single continuous emanation tube charged with radon, that is, radium emanation, the tube usually being made of glass or an equivalent material which will allow the beta and gamma rays to pass through the tube-wall. The radon tube is provided with a removal or withdrawal member, for example, a waxed silk thread or a fine flexible wire. In another form, the removable radon seed may be of the composite type comprising an inner continuous tube charged with emanation and an outer tube enclosing the inner tube. The inner tube filters out the alpha radiation coming from the radium emanation and the outer tube filters out the beta radiation. These tubes may be made of any material which will function to absorb the undesirable rays. The inner tube is usually made of glass and the outer tube of platinum or gold, or alloys of either of these metals. In the composite type of removable radon seed the removal or withdrawal member is made of the materials above referred to attached to the outer tube.

In treating tissue with removable radon seeds, it is necessary to place each seed at an exact predetermined position and to have, after implantation, the thread or removal member protruding from the portal of entrance of the seed in the tissue so that it may be grasped at the time of removal. The removal is effected by pulling the thread out.

Removable seeds have heretofore been implanted by making an incision in the tissue and thereafter depositing the seed in position by means of forceps. This method is not adequate because the seed cannot be placed correctly, and the incision is often dangerous. Further, this method cannot be used when the seed is to be implanted deep into the tissue. Implanters used for non-removable seeds have been tried in order to eliminate the incision step. However, such implanters are unsatisfactory because they do not allow the free introduction of the thread and removal of the implanter. Using implanters of the type at present known, as the seed is pushed in there is always the danger of the thread being cut by the plunger and being tangled at the point of the plunger. When pressure is brought to bear on the point of the seed to which thread is attached, the thread is often cut and the seed lost in the tissue. When this occurs, after the elapse of the required period of radiation, the tissue must be dissected and the seed removed. In using an implanter of the type referred to, the seed has to be pushed by the plunger and, at the end of the needle, it encounters the resistance of the tissue. Considerable pressure must then be applied to the plunger so that the seed will penetrate the tissue. This increase of pressure is objectionable because it increases the chances of cutting the thread and losing the seed.

My improved three-part instrument provided with an automatic loading or inserting mechanism is designed to eliminate the objectionable features above referred to. Broadly, my invention resides in the provision of an instrument for implantation of radon seeds having means for automatically loading or inserting said seeds into the bore of the instrument. By the term "means for automatically loading said seed" it is desired to designate and include all means whereby the trocar in the instrument is initially pressed by a spring or equivalent means against the trocar and finally upon the removal of the trocar, the seed is pushed into the implanter bore without external aid. More specifically, my invention is directed to the combination of a body member provided with a bore, a loading-slot communicating with said bore, a spring-retaining member slidably mounted on the body member and a spring member secured to said spring-retaining member and adapted to load or insert radon seeds into the bore of the body member. It is desired to point out that my invention is not limited to the specific construction of the spring means shown, but it is distinctly understood that the invention is basicly directed to the provision of automatic loading means of whatsoever character, electrical or mechanical, whereby means is provided for initially pressing a radon seed against the trocar of the instrument and finally upon the removal of said trocar, for pushing the seed into the implanter bore without external aid.

In order that my invention may be clearly understood, reference is made to the accompanying drawings, in which Figure 1 is a side view of the implanter, with the trocar in place, Figure 2 is a side view of the trocar, Figure 3 is a side view of the instrument plunger, Figure 4 is a longitudinal section through the implanter, showing the automatic seed loader, Figure 5 is a similar view of the automatic seed loader or inserter in a receded position, Figure 6 is a longitudinal section through the implanter with the trocar and removable seed in place, Figure 7 is a similar view with the trocar removed, Figure 8 is a longitudinal section through the implanter after the plunger has been inserted and has pushed the removable seed into the tissue, Figure 9 is a top view of the implanter and the automatic loader, and Figure 10 is a bottom view of the implanter showing in detail the means for limiting the travel of the spring-retaining means in the direction of implantation.

The instrument is composed of three elements, as indicated in Figures 1, 2 and 3, namely, the implanter 1, the trocar 2 and the plunger 3. The implanter 1 comprises a tubular body portion 4 and a needle 5. The bore 6 extends through the body portion 4 and the needle 5. The needle 5 is of considerably less external diameter than the body portion 4. However, the internal diameter of both is just sufficient to insure a tight fit for the trocar 2. The length of the needle 5 may vary according to the depth it is desired to implant seeds. For example, if it is desired to implant a removable seed two centimeters deep in tissue, an instrument with a needle two centimeters long is used. The depth to which the needle enters is limited by the shoulder 7. The end of the needle 5 is in the form of a truncated cone, as indicated at 8. The end 8 of the needle 5 is so proportioned as to form with the end 29 of the trocar 2 a continuous surface when the needle end and the trocar point are in contact. As indicated in Figure 1, where the needle end meets the trocar point a continuous surface is produced, thereby avoiding the formation of a shoulder to obstruct the penetration of the needle into the tissue.

The tubular body portion 4 of the implanter 1 is provided at the end remote from the needle, with a counter-sunk groove communicating with the tubular bore 6, the counter-sunk groove functioning as a loading-slot for the insertion of radon seeds. The counter-sunk groove 9 has end walls 10 and 11 and side walls 12 and 13, all extending at an acute angle to the axis of the bore 6.

Adjacent to the loading-slot 9 there is a sleeve-receiving member 14, the tubular body portion 4 being enlarged to receive said member. The sleeve-receiving member 14 forms a shoulder 15 with the tubular body portion 4 and a shoulder 16 with the loading slot member 17, which is also an enlargement of the tubular body portion 4. As indicated on the drawing, the external diameters of the loading-slot member 17, the sleeve-receiving member 14 and the lower portion of the tubular body member are different.

Upon the sleeve-receiving member 14 there is mounted a movable sleeve 18. One end of said sleeve is provided with a flange 19 upon which there is mounted a spring member 20. Adjacent to the shoulder 16, the loading slot member 17 is provided with a spring receiving channel 21 in which the spring 20 travels. The bottom wall 22 of the channel 21 is inclined as indicated in Figures 6, 7 and 8. The spring member 20 may be formed in a variety of ways but it is preferably formed as shown and bent at an angle as at 23 and having a cup portion 24 at its free end. The movable sleeve 18 is provided with a slot 26 and the movement of the sleeve in the direction of implantation is limited by the pin 25.

The trocar 2 comprises a rod of any suitable material, the outside diameter of which being just sufficiently smaller than the inside diameter of the tubular body portion 4 and needle 5 so as to provide a tight fit. The trocar is provided with either a single or double head, indicated by the numerals 27 and 28. The double head facilitates the handling of the trocar. The trocar 2 is also provided with a needle end 29. The plunger 3 may comprise a thin rod of any suitable material having an outside diameter much smaller than the inside diameter of the bore 6 so that when a removable seed 32 provided with a withdrawal or removal member 33 is pushed through the bore 6 there is room enough for the removal member 33 to slide along the bore 6 of the instrument. This is indicated in Figure 8. The plunger 3 is provided with a head 30 and is more flexible than the trocar 2.

The method of using the instrument is as follows: The trocar 2 is placed in the implanter 1. Thereafter, the sleeve 18 is moved away from the loading-slot 9, as shown in Figure 5, and a removable seed 32 having a withdrawal or removal member 33 is deposited in the counter-sunk groove or loading-slot 9. The sleeve 18 is then pushed toward the counter-sunk groove 9.

As a result thereof, the spring member 20 passes through the spring receiving channel 21 and presses against the seed 32 which in turn presses against the trocar 2 stationary in the bore 6 of the implanter 1. The instrument having been loaded, it is then inserted into the tissue 34 to be treated, the shoulder 7 limiting the depth of penetration. The position of the instrument and seed at this stage is indicated in Figure 6.

The trocar 2 is then removed from the implanter 1. The removal of the point 29 of the trocar 2 from the tissue 34 leaves a space 35 surrounded by a broken tissue. On removal, as the point 29 of the trocar 2 passes the loading-slot 9, no resistance is offered to the pressure of the spring member 20 and the seed 32 is pushed by the spring member 20 into the bore 6 of the implanter, without external aid. Figure 7 indicates the position of the instrument and seed at this stage.

The plunger 3 is thereafter introduced into the bore 6 of the implanter 1, the seed 32, together with the withdrawal or removal member 33, passing along the bore 6 and the seed 32 is finally deposited in the space 35 formed in the tissue 34. The withdrawal or removal member 33 follows the seed 32 through the loading-slot 9, and the bore 6 of the instrument.

The advantages of automatic loading and especially its use in connection with the three-part instrument are numerous. The use of this instrument does away with the necessity of having an assistant load the seed after the instrument has been inserted in the tissue. Using an instrument with the automatic loading arrangement, the instrument is always loaded before inserting in the tissue. Time is saved when using the new instrument and this is especially important in cases where bleeding occurs and blood comes out through the bore of the instrument. It is desired to indicate that the loading of the seed into the bore of the instrument by hand while the instrument is in position may cause the instrument to be moved slightly, with the result that the seed is not placed at the correct point in the tissue. It is desired to point out that after the instrument is once in position, the hand does not come in contact with the seed.

The provision of a three-part instrument whereby a puncture is made in the tissue by the point of the trocar and thereafter the trocar is removed, offers many advantages. Using the three-part instrument, the necessity of applying undue pressure to the seed to be implanted is not necessary, the possibility of cutting the removal member of the seed is substantially eliminated, or at least greatly reduced. Using the three-part instrument, the seed cannot be placed deeper in the tissue than is required since the instrument is provided with means for limiting the depth of penetration of the needle.

From the above, it is clear that my invention, in its broadest aspect, comprises an implanter having a bore therein for the passage of radon seeds and means mounted upon the implanter for inserting a radon seed into said bore. More specifically, the invention comprises in an instrument for the implantation of removable radon seeds in tissue, the combination of an implanter, a bore passing through the implanter, means for positioning a radon seed externally of said bore, and means for initially applying pressure upon said seed and finally, without external aid, applying additional pressure to insert the radon seed into the implanter bore. The means for positioning the radon seed may comprise, as specifically pointed out, a trocar in the instrument bore. However, my invention is not limited to this specific positioning means. My automatic seed loading, feeding, or inserting arrangement may be used in implanters not utilizing both a trocar and a plunger. The means for initially applying slight pressure upon the seed and finally, without external aid, applying additional pressure to insert the seed into the implanter bore may comprise, as pointed out, a spring member which operates to apply slight pressure upon the seed when the trocar is in the implanter bore and finally, when the trocar is removed, applies additional pressure and thereby inserts the seed into the implanter bore. However, it is to be understood that my invention is not limited to the specific means set forth, this merely being used as an illustrative embodiment of the preferred form of my invention.

What I claim is:

1. In an instrument for the implantation in tissue of radon seeds, the combination in an implanter having a bore passing therethrough adapted to receive a trocar, and a lateral seed-loading opening communicating with said bore; of means for positioning a radon seed at the seed opening and against the trocar working in said bore, said means forcing the seed into the implanter bore upon the removal of the trocar.

2. In an instrument for the implantation in tissue of removable radon seeds, the combination in an implanter provided with a bore and a loading-slot communicating with said bore, of a spring-retaining member slidably mounted on said implanter, and a spring member secured to said spring-retaining member, and adapted to insert a radon seed into the bore of said implanter after it has been preliminarily placed in position adjacent the bore.

3. In an instrument for the implantation in tissue of removable radon seeds, the combination in an implanter provided with a bore, loading-slot and sleeve-retaining means; of a loading-slot in said loading-slot means; of a slidable sleeve working on said sleeve-retaining member, a channel in said loading-slot means adjacent to said sleeve-retaining means, and a spring member secured to said slidable sleeve and working in said channel to insert a removable radon seed into the bore of the implanter.

4. In an instrument for the implantation in tissue of removable radon seeds, the combination in an implanter provided with a bore, loading-slot and sleeve-retaining means; of a loading-slot in said loading-slot means, a slidable sleeve working on said sleeve-retaining means, a channel in said loading-slot means provided with an inclined bottom wall adjacent to said sleeve-retaining means, and a spring member secured to said slidable sleeve and working in said channel to insert a removable radon seed into the bore of the implanter.

5. In an instrument for the implantation of removable radon seeds, the combination in an implanter provided with a bore, loading-slot and sleeve-retaining means; of a loading-slot in said loading-slot means, a slidable sleeve working on said sleeve-retaining means, means thereon for limiting the travel of said slidable sleeve in the direction of implantation, a channel in said loading-slot means adjacent to said sleeve-retaining means, and a spring member secured to said slidable sleeve and working in said channel to insert a removable radon seed in the bore of the implanter.

6. In an instrument for the implantation in tissue of radon seeds provided with a removal or withdrawal member, the combination in an implanter having a bore passing therethrough, and a lateral seed-loading opening, said bore being adapted to receive a removable trocar; of means for initially positioning a seed against the trocar and finally upon removal of the trocar forcing the seed into the bore, and a plunger having an external diameter substantially smaller than the internal diameter of the bore of the implanter whereby sufficient room is provided for the withdrawal or removal member of the seed to slide together with the seed along the bore of the implanter.

7. In an instrument for the implantation in tissue of radon seeds provided with a removal or withdrawal member, the combination in an implanter having a bore passing therethrough, and a lateral seed-loading opening communicating with said bore; of a plunger having an external diameter substantially smaller than the internal diameter of the bore of the implanter whereby sufficient room is provided for the removal or the withdrawal member of the seed to slide together with the seed along the bore of the implanter.

In testimony whereof I hereunto affix my signature.

JOSEPH MUIR.